April 12, 1955 C. E. CONNOLLY 2,706,079

STORAGE UNIT FOR ACCOUNTING MACHINES

Filed March 29, 1952

2 Sheets-Sheet 1

INVENTOR
CHARLES E. CONNOLLY
BY William Lang
ATTORNEY

INVENTOR
CHARLES E. CONNOLLY
BY William Lang
ATTORNEY

United States Patent Office 2,706,079

Patented Apr. 12, 1955

2,706,079

STORAGE UNIT FOR ACCOUNTING MACHINES

Charles E. Connolly, Endicott, N. Y., assignor to International Business Machines Corporation, New York, N. Y., a corporation of New York Application March 29, 1952, Serial No. 279,426

10 Claims. (Cl. 235—61)

This invention relates to a storage unit for use in electric accounting machines.

This storage unit includes a revolving drum synchronized with the movement of a record card. The apparatus may be used wherever it is desired to store data taken from a record card and then read out the stored information at a subsequent time. The unit may be conveniently provided as an attachment to an accounting machine to be used in conjunction with the accumulating mechanism or to replace the accumulating mechanism where it is desired to store and read out information rather than count the number of occurrences of designations on record cards successively fed into the machine.

The principal object of the invention is to provide an improved and simplified storage unit of the type for use in electric accounting machines.

An object of the invention is to provide a low cost storage unit for use in accounting machines.

A further object of the invention is to provide an improved device to selectively store data obtained from record cards and novel means to reset the device after the data is read out.

Another object of the invention is to provide means to reset selected columns of a storage unit upon which data has been stored.

Other objects of the invention will be pointed out in the following description and claims and illustrated in the accompanying drawings, which disclose, by way of example, the principle of the invention and the best mode, which has been contemplated, of applying that principle.

Figure 1:
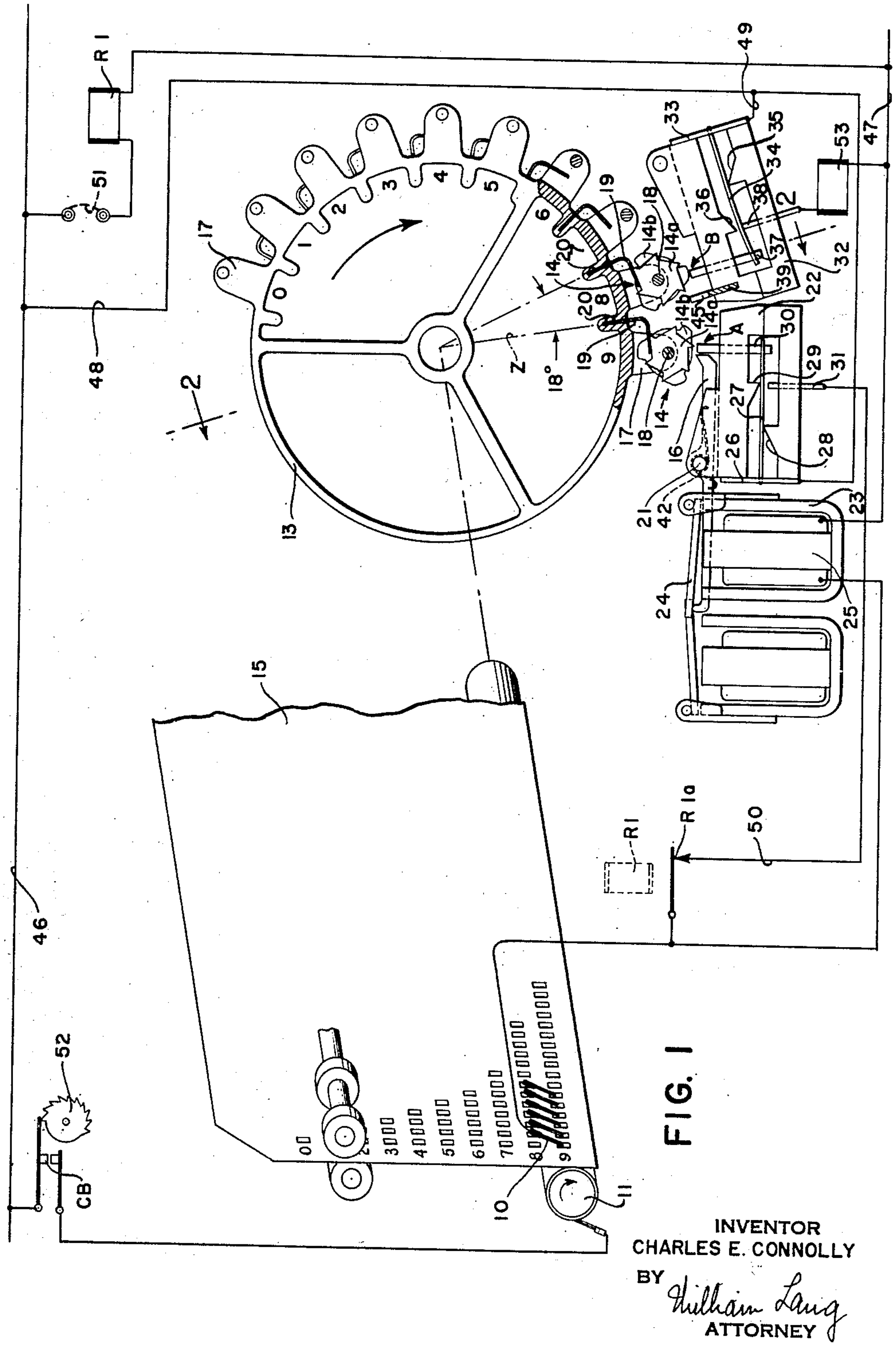
Fig. 1 is a side view, partly in section, of the storage unit showing the manner in which the storage unit is synchronized with a well known type of record card and the wiring diagram of the electric circuit which operates the storage unit.

In Fig. 1 the card sensing mechanism of a well known electric accounting machine is diagrammatically shown as comprising sensing brushes 10, between which and a contact roller 11 record cards designated 15 having columns of index positions move so that the brushes sense the positions in the order 9, 8, 7, 6, etc., and the occurrence of a perforation in any such position will enable a brush 10 to contact roller 11 through the perforation at the time the related position is sensed. The record cards are continuously fed so that a card is passed beneath the brushes 10 on each cycle of operation.

A storage drum 13 has a row of settable ratchet cam wheels 14 positioned about the periphery thereof for each index position of a record card 15. Drum 13 is synchronized with the movement of the cards 15, so that its positions 9, 8, 7, 6, etc., pass a set-up reset pawl member 16 as the corresponding card positions pass brushes 10. The record cards 15 are advanced by the usual feed rollers to a position between brushes 10 and contact roller 11. The circuit connections controlled through brushes 10 and storage drum 13 will be fully explained in connection with the later description of the circuit diagram which is shown in Fig. 1 for only one brush 10. It should be understood that duplicate circuits exist for each brush 10.

Storage drum 13 is driven in a clockwise direction, as viewed in Fig. 1, through the main driving mechanism (not shown) of an electric accounting machine in such a manner that it makes one revolution for one complete card cycle or data setting cycle. Drum 13 is provided with a series of projections 17 extending from the periphery thereof which have a plurality of cut-out portions therein to give each projection 17 a comb appearance (see Fig. 2). Extending through each projection 17 is a rod 18 upon which are rotatably mounted the ratchet cam wheels 14. There is a wheel 14 on each rod 18 for each column of record card 15 making a total of ten wheels 14 for each column.

Figures 2, 3:
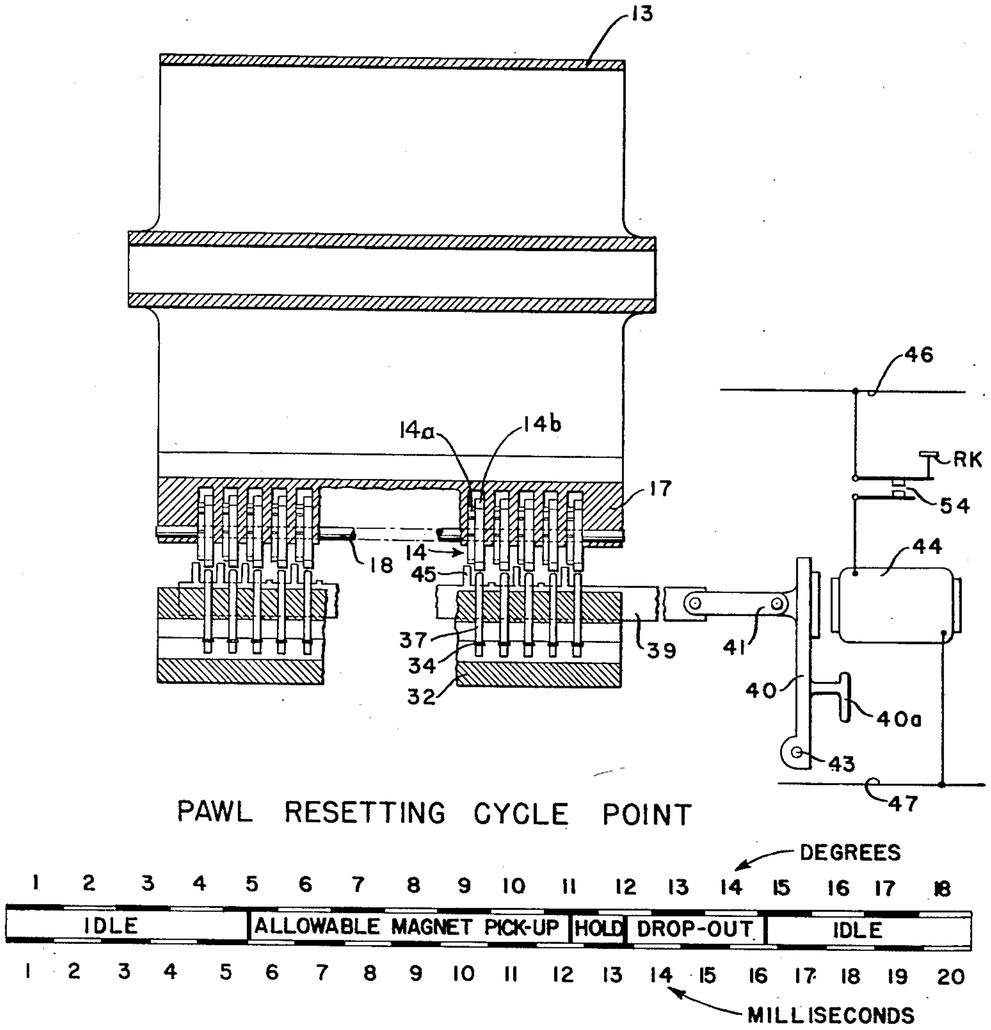
Fig. 2 is a sectional view taken along lines 2—2 of Fig. 1, the section being taken through the storage drum to show a row of settable ratchet cam wheels and the selectively controlled reset mechanism for enabling a read-out of successively fed cards.
Fig. 3 is a diagram showing the timing of the mechanism which resets the ratchet cam wheels on the storage drum during the resetting cycle point of operation.

Referring to Figs. 1 and 2, it is seen that each wheel 10 has a ratchet portion 14a and a trio of cam portions designated 14b disposed at spaced intervals on the outer surface of the wheel. A detent spring 19 is provided for each ratchet cam wheel 14 and is fixed in a slot 20 cut radially in the face of storage drum 13. Springs 19 are held in position by spring tension maintained by ratchet portions 14a of wheels 14.

Each ratchet cam wheel 14 is preferably made of plastic material, the ratchet portion 14a (Fig. 1) being a six position ratchet which provides a flat surface as a seat for the associated detent spring 19 in any one of the six positions. The trio of cam portions 14b are located approximately 120° apart on the surface of wheel 14. Each detent spring 19 has two legs approximately 90° apart, one leg residing in the slot 20 cut in storage drum 13 and the other leg being seated on ratchet 14a out of the path of cam portions 14b. This method of assembly eliminates the necessity of a positive fastener for the detent springs 19. These springs are fabricated from one piece of sheet spring stock, the individual springs being joined on one leg to give the spring assembly a comb appearance. The common side is placed in drum slot 20 and the free legs are seated on ratchets 14a.

Positioned directly below drum 13 and secured to the accounting machine on which the device of this invention is to be used are the means for setting up data obtained from the sensing of a record card 15 by brushes 10 and the means for subsequently reading out the information stored on drum 13.

Pawl 16 (Fig. 1) is pivotally mounted on a rod 21 which is secured on a moulding 22 fixed to the accounting machine. For purposes of this invention moulding 22 is preferably made from a plastic material. Positioned to the left of moulding 22 is a magnet 23 having an armature 24, there being a magnet 23 for each card column disposed in staggered relation with respect to the magnet for the adjacent column. The left end of pawl 16 extends under armature 24 and is upturned to engage the underside of the armature. The core 25 of magnet 23 is located beneath armature 24. Energization of magnet 23 causes armature 24 to move toward core 25, thereby pushing the upturned end of pawl 16 downwardly. Pawl 16 is pivoted about rod 21 on moulding 22 in a counterclockwise direction into the path of the ratchet portion 14a to index wheel 14 as it is carried past the setting station, shown at A in Fig. 1, by rotation of drum 13. A wire spring 42 is wound around rod 21 to return pawl 16 to the normal inactive position upon deenergization of magnet 23. A ratchet cam wheel 14 is thus set up and data is stored on drum 13 for subsequent reading out as explained more fully hereinafter in connection with the operation of the device.

Moulding 22 is formed with a hollowed out center section as shown in Fig. 1. An electrically conducting plate 26 forms one side of moulding 22 and a contact wire 27 extends from plate 26 into the hollowed out center of the moulding. Wire 27 passes between a pair of projections 28 and 29 extending from the interior of moulding 22 which prevent excessive play in wire 27 during operation of the storage. The free end of wire 27 is passed through a hole in the lower portion of an operating contact arm 30 which extends upwardly through an opening in the top portion of moulding 22. A resetting terminal 31 protrudes through the bottom portion of moulding 22 to a position slightly below wire 27. It is readily seen that a downward displacement of arm 30 causes wire 27 to make contact with reset terminal 31, thereby completing a circuit to cause resetting of a ratchet cam wheel 14 as described hereinafter in detail.

The readout station is positioned to the right of the setting station, as viewed in Fig. 1, and is housed in a plastic moulding 32 which is similar in construction to the moulding 22 described above. An electrically conducting plate 33 forms one side of moulding 32 and a contact wire 34 extends from plate 33 into a central hollowed out section of the moulding. Wire 34 passes between a pair of projections 35 and 36 extending from the interior of moulding 32 and through a hole in the lower portion of an operating contact arm 37 which extends upwardly through an opening in the top portion of moulding 32. A readout terminal 38 protrudes through the bottom portion of moulding 32 to a position slightly below wire 34. A downward displacement of arm 37 causes wire 34 to make contact without readout terminal 38, thereby completing a circuit to cause a readout of the data stored on drum 13 as described more fully hereinafter.

In describing the set-up, resetting and readout mechanisms, only one card column has been considered. It should be understood that similar mechanisms are provided for each card column.

Provision is also made to read and store information in the same index positions on successive cards without losing a card cycle. Referring again to Fig. 1, a bar 39 is slidably mounted between the readout station operating arm 37 and resetting operating arm 30. Bar 39 is joined to an armature 40 (Fig. 2) of a magnet 44 through a link member 41. Armature 40 is pivotally mounted to the accounting machine at 43. The magnet 44 is positioned to the right of armature 40 and upon its energization, the armature is moved toward the core of magnet 44 pulling bar 39 with it.

Bar 39 is formed with a series of tabs 45 which project upwardly from the top surface of the bar giving it a notched appearance. A tab 45 can be provided for each card column. The tabs 45 of columns which are not desired to be reset by the action of bar 39 may have a cut in the base to weaken the metal so that the tabs can be easily broken out as shown in Fig. 2. When bar 39 is brought into operation by magnet 44, the tabs 45 are moved into the paths of the cam portions **14*b* of ratchet cam wheels 14 to reset all columns which have been set up except those which have the tabs 45 broken out. By resetting predetermined columns to a non-set position, it is possible to again set up data in all the index positions of these columns when the wheels 14 pass the setting station on the following cycle. Magnet 44 is selectively controlled through a reset key RK. Depression of key RK closes contacts 54 to establish a circuit from line side 46, through contacts 54, magnet 44 to line side 47. Armature 40 is also provided with a handle 40*a* for manual operation when desired. These columns which are not reset by bar 39 are reset by the magnets 23 which require an additional cycle. It is thus possible to reset predetermined columns, after the ratchet cam wheels 14** pass the readout unit, in the same cycle in which the wheels have been set up.

*Operation of the device*

The operations will now be described by which the device of this invention stores data taken from a record card and then reads out the information stored at a subsequent time. Storage drum 13 is rotated in synchronization with the feeding of record cards 15 through the sensing station so that as the 9's index point position for the card columns is sensed by brushes 10, the row of ratchet cam wheels 14 for the 9's index position is passing the pawls 16. The remaining index positions of the card are similarly timed with the related row of wheels 14 on the drum. If a 9 is sensed in card 15 as shown in Fig. 1, a pulse from the sensing circuit, described hereinafter, will be sent to magnet 23 for the proper column at the 9 time. Upon energization of magnet 23, armature 24 is moved downwardly toward core 25 and pawl 16 is pivoted in a counterclockwise direction about rod 21 into the path of wheel 14 to engage ratchet portion **14*a* and thereby index the wheel 14 one position. Cam portion 14*b* of wheel 14 is moved to the active position shown at B in Fig. 1. In the case where no hole is punched in the card in the 9 index position, the magnet 23 is not energized and wheel 14 is carried past the setting station without being engaged by the pawl 16 and the cam portion 14*b* of wheel 14 remains in the position shown at A in Fig. 1. The impulse to the magnet 23 is of short duration so that it is possible to store on the drum information punched in each of the ten index positions on the card in one cycle of operation. It should be noted that when wheel 14 is in either a set or non-set position, detent spring 19 locks the wheel 14 in both positions so that it cannot be moved except under the influence of pawl 16**.

*Data set-up circuit.*—With the card 15 in the position shown in Fig. 1, the magnet 23 is energized through a circuit traceable from line side 46, through circuit breaker contacts CB, contact roller 11, hole in card 15, brush 10, magnet 23 to line side 47. The energization of magnet 23 causes pawl 16 to move into the path of wheel 14 as explained hereinbefore. The circuit breaker contacts CB are operated by the teeth of a dentated cam 52 which allows impulses to be sent to magnet 23 in timed relationship with the sensing of index positions on card 15. The cam 52 is driven to close its contacts CB at the index positions in every cycle of operation.

If information is stored on drum 13, when the index positions pass the setting station, it is read out at the readout station which is designated B in Fig. 1. When a wheel 14 has been set up, a cam portion **14*b* is in operative position to engage operating contact arm 37 as wheel 14 passes the readout station, thereby displacing arm 37 downwardly. As arm 37 moves downward, contact wire 34 is flexed and closes the contact between wire 34 and the readout terminal 38**.

*Data readout circuit.*—With a wheel 14 in the position shown at B in Fig. 1, wire 34 makes contact witth terminal 38 which completes a circuit traceable from line side 46, through wire 48, wire 49, conducting plate 33, contact wire 34, terminal 38, magnet 53 to line side 47. Magnet 53 is a delayed impulse controller which can be utilized to control punching, printing, adding or any circumstance where for some reason of cyclic timing in the accounting machine it is not possible to take a direct reading from the card 15.

In the storage device of the present invention, it is possible to reset the wheels 14 in all columns or to reset the wheels 14 only in selected columns. When all columns in which information is stored are to be reset, the resetting operating contact arms 30 in these columns are displaced downwardly by a cam portion **14*b* of wheels 14 as the storage drum 23 moves the wheels 14 set up in the index point positions past the resetting operating arm 30 at the setting station shown at A in Fig. 1. As arm 30 moves downward, contact wire 27 is flexed and closes the contact between wire 27 and the reset terminal 31**.

*Resetting circuit.*—With wheel 14 in the position shown at B in Fig. 1, advancement to the resetting station shown at A in Fig. 1 causes wire 27 to make contact with terminal 31 which completes a circuit traceable from line side 46, through wire 48, conducting plate 26, contact wire 27, terminal 31, wire 50, normally closed relay contacts R1*a*, magnet 23 to line side 47. Energization of magnet 23 causes pawl 16 to move into the path of wheel 14 and index the wheel as in the setting operation. If no information has been stored in the wheel, operating contact arm 30 is not depressed to close the circuit to magnet 23 and pawl 16 remains inoperative. Consequently, wheel 14 remains in the non-indexed position. It is thus seen that two cycles are normally required to set up and restore a wheel 14 for a particular index position.

In Fig. 1 storage drum 13 is shown with the centers of rods 18 arranged around the periphery thereof at 18° intervals. The storage device of this invention operates on a twenty point cycle, the resetting cycle point of operation being diagrammatically shown in the timing chart of Fig. 3. The beginning of the resetting cycle for a ratchet cam wheel 14 occurs when drum 13 is rotated to bring the rod 18 which supports the wheel 14 into position to have line Z in Fig. 1 running through the rod 18. Line Z is initially to the right of resetting operating arm 30, as viewed in Fig. 1, to such an extent that 5° of idle clockwise rotation of drum 13 are traversed before a cam portion **14*b* of wheel 14 strikes arm 30**.

Referring now to Fig. 3, it is seen that during the first 5° of the resetting cycle, drum 13 is engaged in idle clockwise rotation. At 5° a cam portion **14*b* of wheel 14 engages the resetting operating arm 30 to depress it and close a circuit to magnet 23. The magnet 23 is picked up or energized by 11° at which time it is held energized for 1°. When drum 13 has rotated 12°, pawl 16 indexes wheel 14 and arm 30 is released by cam portion 14*b* for the following 2° to open the circuit to magnet 23. The remaining 5° of the cycle point are utilized by drum 13** in idle clockwise rotation.

*Selective resetting circuit.*—If resetting of selected columns is desired so that certain information can be stored on drum 13 and used successively, then relay R1 is activated through a plugwire connection 51 (Fig. 1) and the normally closed relay contacts R1*a* are opened to break the resetting circuit to magnet 23. The circuit which holds relay R1 energized is traceable as follows: From line side 46, through plugwire connection 51, relay R1 to line side 47. Depression of arm 30 does not then cause energization of magnet 23 because of the break in the circuit to the magnet 23 and pawl 16 remains in the inoperative position. In this manner resetting of wheels 14 can be prevented in selected columns or all columns.

The operation of the bar 39 which resets predetermined columns of storage drum 13 has already been described in detail.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data storage device comprising a plurality of parallel rods spaced in a circle, a plurality of settable elements on each rod with each element having a set and a non-set position, a setting station, means for moving the rods past said station in succession, and means at said station for selectively changing the setting of any element on a rod when the rod is at said station, from its set to non-set position or from its non-set to its set position, said setting being rotative with respect to the rod.

2. A data storage device comprising a plurality of parallel rods spaced in a circle, a plurality of settable elements on each rod with each element having a set and a non-set position, a setting station, means for moving the rods past said station in succession, means at said station for selectively changing the setting of any element on a rod when the rod is at said station, from its set to non-set position or from its non-set to its set position, said last named means including a device for each element on a rod, controlled by the element when in its set position, for shifting the element to its non-set position, and a presettable device for rendering said control ineffective for certain predetermined elements, whereby the same will remain in set position while the related rod moves past the setting station.

3. In a data storage device, a ring of settable elements, each having a set and a non-set position, a setting station adjacent said ring, means at said setting station to selectively move said elements from a non-set to a set position, means for moving the elements past said station in succession, a readout station, means at said readout station for effecting a readout of data from the elements in a set position and means at said setting station controlled by the elements in a set position to effect a movement of said elements in a set position to a non-set position.

4. In a data storage device, a ring of settable elements, each having a set and a non-set position, a setting station adjacent said ring, means at said setting station to selectively move said elements from a non-set to a set position at the beginning of a data setting cycle, means for moving the elements past said station in succession, a readout station, means at said readout station for effecting a readout of data from the elements in a set position, and means at said setting station controlled by the elements in a set position to effect a movement of said elements in a set position to a non-set position at the end of said cycle.

5. In a data storage device, a ring of settable elements, each having a set and a non-set position, a setting station adjacent said ring, means at said setting station to selectively move said elements from a non-set to a set position, means for moving the elements past said station in succession, a readout station beyond said setting station, means at said readout station for effecting a delayed readout of data from the elements in a set position, and means at said setting station controlled by the elements in a set position to effect a movement of said elements in a set position to a non-set position.

6. In a data storage device, a storage drum having columns of settable elements spaced around the drum, each element having a set and a non-set position, a setting station adjacent to said drum, means at said setting station to selectively move said elements from a non-set to a set position, means for moving the elements past said station in succession, a readout station, means at said readout station for effecting a readout of data from the elements in a set position, means at said setting station controlled by the elements in a set position to effect a resetting of the elements in a set position and means manually operable and settable in advance of the resetting time for preventing resetting of elements in selected columns whereby the same will remain in a set position to cause a repetitive readout of said data at the readout station.

7. In a record controlled data storage device, a ring of settable elements, each having a set and a non-set position, a setting station adjacent said ring, means for sensing data indicia on said control record, means at said setting station under control of said record sensing means to selectively move said elements from a non-set to a set position, means for moving the elements past said station in succession, a readout station, means at said readout station for effecting a readout of data from the elements in a set position and means at said setting station controlled by the elements in a set position to effect a movement of said elements in a set position to a non-set position.

8. In a data storage device, a ring of settable members, each of said members comprising a ratchet portion and a cam portion, a setting station adjacent said ring, means at said setting station to selectively engage a tooth of said ratchet portion to move a member from a non-set to a set position, means for moving the members past said station in succession, a readout station beyond said setting station, means at said readout station for effecting a readout of data from the members in a set position, and means at said setting station under control of the cam portion of each member in a set position, whereby movement of said members in a set position to a non-set position is effected.

9. In a data storage device, a ring of settable members, each of said members comprising a ratchet portion and a cam portion, a setting station adjacent said ring, a pawl located at said setting station to selectively engage a tooth of said ratchet portion to move a member from a non-set to a set position, means for moving the members past said station in succession, a readout station beyond said setting station, means at said readout station for effecting a readout of data from the members in a set position, an operating arm positioned at said setting station and engageable by the cam portion of each member in a set position, and means responsive to actuation of said operating arm by a cam portion to cause said pawl to again engage a tooth of said ratchet, whereby movement of said members in a set position to a non-set position is effected.

10. In a data storage device, a ring of settable members, each of said members comprising a ratchet portion and a cam portion, means for yieldably holding said members in a non-set or a set position, a setting station adjacent said ring, a pawl located at said setting station to selectively engage a tooth of said ratchet portion to move a member from a non-set to a set position against the action of the means for yieldably holding said members, means for moving the members past said station in succession, a readout station beyond said setting station, means at said readout station for effecting a readout of data from the members in a set position, an operating arm positioned at said setting station and engageable by the cam portion of each member in a set position, and means responsive to actuation of said operating arm by a cam portion to cause said pawl to again engage a tooth of said ratchet, whereby movement of said members in a set position to a non-set position is effected.

References Cited in the file of this patent

UNITED STATES PATENTS

| | | |
|---|---|---|
| 1,156,043 | Shephard et al. | Oct. 5, 1915 |
| 2,172,067 | Mills | Sept. 5, 1939 |
| 2,301,823 | Shepherd | Nov. 10, 1942 |
| 2,445,829 | Henrikson | July 27, 1948 |
| 2,606,244 | Johnson et al. | Aug. 5, 1952 |